United States Patent
Loesch et al.

(10) Patent No.: US 10,126,409 B2
(45) Date of Patent: Nov. 13, 2018

(54) METHOD AND MIMO RADAR DEVICE FOR DETERMINING A POSITION ANGLE OF AN OBJECT

(71) Applicant: Robert Bosch GmbH, Stuttgart (DE)

(72) Inventors: Benedikt Loesch, Stuttgart (DE); Michael Schoor, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 524 days.

(21) Appl. No.: 14/877,495

(22) Filed: Oct. 7, 2015

(65) Prior Publication Data
US 2016/0097847 A1    Apr. 7, 2016

(30) Foreign Application Priority Data

Oct. 7, 2014 (DE) .................. 10 2014 220 246
Feb. 26, 2015 (DE) .................. 10 2015 203 454

(51) Int. Cl.
| | | |
|---|---|---|
| *G01S 13/93* | (2006.01) | |
| *G01S 7/282* | (2006.01) | |
| *G01S 13/44* | (2006.01) | |
| *G01S 5/06* | (2006.01) | |
| *G01S 5/04* | (2006.01) | |
| *G01S 7/35* | (2006.01) | |
| *G01S 13/42* | (2006.01) | |

(52) U.S. Cl.
CPC .............. *G01S 7/35* (2013.01); *G01S 13/42* (2013.01); *G01S 13/931* (2013.01); *G01S 5/04* (2013.01); *G01S 5/06* (2013.01); *G01S 7/282* (2013.01); *G01S 13/4445* (2013.01); *G01S 13/4454* (2013.01)

(58) Field of Classification Search
CPC ... G01S 5/04; G01S 5/06; G01S 7/282; G01S 7/35; G01S 13/343; G01S 13/345; G01S 13/42; G01S 13/426; G01S 13/4445; G01S 13/4454; G01S 13/931
See application file for complete search history.

(56) References Cited

U.S. PATENT DOCUMENTS

| | | | | |
|---|---|---|---|---|
| 6,611,227 B1 * | 8/2003 | Nebiyeloul-Kifle | ........................ G01S 7/4004 | |
| | | | | 180/167 |
| 6,995,730 B2 * | 2/2006 | Pleva | ..................... G01S 7/032 | |
| | | | | 343/853 |
| 9,778,350 B2 * | 10/2017 | Schoor | .................... G01S 13/48 | |

(Continued)

*Primary Examiner* — Peter M Bythrow
(74) *Attorney, Agent, or Firm* — Norton Rose Fulbright US LLP; Gerard Messina (57) ABSTRACT

A method and a MIMO radar device are provided for determining a position angle of an object. The method includes the following steps: emitting a first radar signal with the aid of a first transmitting antenna having a first radiation pattern; emitting a second radar signal with the aid of a second transmitting antenna having a second radiation pattern; emitting a third radar signal with the aid of a third transmitting antenna having a third radiation pattern; the first, second, and third radar signal being emitted in various directions; receiving radar signals which are reflected on the object; and determining the position angle of the object based on phase differences and based on amplitude differences, which originate from the emission of the radar signals in the first through third directions, between the received reflected radar signals.

8 Claims, 4 Drawing Sheets

(56) References Cited

U.S. PATENT DOCUMENTS

| | | | |
|---|---|---|---|
| 2009/0073025 A1* | 3/2009 | Inoue | G01S 13/325 342/70 |
| 2009/0207071 A1* | 8/2009 | Kinoshita | G01S 13/4454 342/156 |
| 2012/0256795 A1 | 10/2012 | Tajima | |
| 2013/0088383 A1* | 4/2013 | Forstner | H01Q 1/3233 342/175 |
| 2013/0234881 A1* | 9/2013 | Binzer | G01S 13/931 342/70 |
| 2013/0338912 A1* | 12/2013 | Binzer | G01S 13/931 701/300 |
| 2013/0342387 A1* | 12/2013 | Zwick | G01S 13/325 342/202 |
| 2014/0306840 A1* | 10/2014 | Koerber | G01S 7/032 342/107 |

\* cited by examiner

METHOD AND MIMO RADAR DEVICE FOR DETERMINING A POSITION ANGLE OF AN OBJECT

FIELD OF THE INVENTION

The present invention relates to a method and a MIMO radar device for determining a position angle of an object. The MIMO radar device may be situated in particular in a vehicle, such as a road vehicle, rail vehicle, aircraft, or watercraft. The position angle of an object is understood in particular to mean that angle at which the object is situated in relation to a reference axis. For applications in a vehicle, this is preferably the forward travel direction, centered on the middle of the vehicle in the transverse direction. Reference to an angular dependency below is understood to mean a dependency on the position angle. The position angle may in particular be the so-called azimuth angle, which is based on a vehicle.

BACKGROUND INFORMATION

In technical usage, MIMO stands for "Multiple Input Multiple Output," and refers to a system or method according to which multiple transmitting antennas and multiple receiving antennas are used for achieving an effect, for example for transmitting information, or, as in the present case, for detecting at least the position of an external object, using a radar device. Transmitting antennas are designed in particular for emitting an electromagnetic signal. Receiving antennas are designed in particular for receiving an electromagnetic signal. When reference is made to "antennas" here and in the following discussion, this is understood to mean transmitting antennas as well as receiving antennas, without distinction.

Numerous electronic systems are employed in recent vehicles, and may be used, for example, to assist a driver while driving the vehicle. For example, brake assist systems may recognize preceding road users and appropriately decelerate and accelerate the vehicle so that a predefined minimum distance from the preceding road users is always maintained. Such brake assist systems may also initiate an emergency brake application when they recognize that there is too little distance from the preceding road user.

To be able to provide such assistance systems in a vehicle, it is necessary to collect data concerning the surroundings of the particular vehicle. In the above-mentioned example of a brake assist system, it is necessary, for example, to detect the position of a preceding road user in order to be able to compute the distance of the vehicle from the preceding road user.

In the detection of the position of a preceding road user, for example the azimuth angle of the preceding road user, starting from the travel direction of the particular vehicle, may be detected. The azimuth angle is part of an advantageous spherical coordinate system based on the radar device, but also based on the vehicle for a radar device situated in a vehicle. The azimuth angle is situated with respect to the vehicle in such a way that for a variation from 0° to 360°, the azimuth angle covers a plane in parallel to the driving plane on which the vehicle is traveling. With the aid of the azimuth angle, for example an object to the left of the vehicle in the forward travel direction is distinguishable from an object to the right of the vehicle in the forward travel direction.

Since functionally irrelevant objects such as manhole covers or bridges also reflect electromagnetic signals as radar signals, detecting the elevation angle allows a distinction to be made between functionally relevant and irrelevant objects. The elevation angle is another part of the described spherical coordinate system, and for a variation from 0° to 360°, covers a plane perpendicular to the roadway on which the vehicle is traveling. The last independent coordinate of the described spherical coordinate system is the distance or radius.

Detection of the azimuth angles or elevation angles of an object may take place, for example, by evaluating the electromagnetic phase shifts of electromagnetic signals reflected on the object which are received at the receiving antennas of a radar device.

U.S. Published Patent Appln. No. 2012/256795 provides one possible antenna for such a radar device.

For a two-dimensional antenna array having phase centers xi in a first coordinate direction and yi in a second coordinate direction perpendicular thereto, the following expression is valid for phase φi at antenna i:

$$\varphi i = \frac{2\pi}{\lambda}(xi * \sin\theta * \cos\Phi + yi * \sin\Phi),$$

where θ represents the azimuth angle and Φ represents the elevation angle.

It is desirable to manage with a preferably small number of antennas, i.e., transmitting antennas and receiving antennas, of the antenna array of the radar device. Use of the known MIMO principle combines reception signals of multiple switching states, and thus allows the formation of virtual arrays with an enlarged aperture of a large number of virtual antennas.

The virtual arrays av(θ) are formed by folding the receiving antenna array, which is made up of the receiving antennas, with the transmitting antenna array, which is made up of the transmitting antennas, i.e., by forming all possible products of the one-way antenna diagrams atx(θ) of the transmitting antennas with the one-way antenna diagrams arx(θ) of the receiving antennas:

$$av(\theta) = atx(\theta) \otimes arx(\theta),$$

where ⊗ symbolizes the Kronecker product, i.e., forms all possible products of the elements of vectors atx(θ) and arx(θ).

Conventional radar devices require phase coherence between various switching and transmission states of the transmitting antennas. For time multiplex MIMO, objects which are moved relative to the radar device result in a phase shift between transmission states, for which reason compensation methods for compensating for the phase shift are used. Errors in the speed estimation result in residual phase shifts which have an adverse effect on the subsequent position angle determination, in particular if radar signals having relatively slow FMCW ramps are emitted.

SUMMARY

The present invention provides a method and a MIMO radar device.

The present invention thus provides a method for determining a position angle of an object, including the following steps: emitting a first radar signal with the aid of a first transmitting antenna having a first radiation pattern; emitting a second radar signal with the aid of a second transmitting antenna having a second radiation pattern; emitting a third radar signal with the aid of a third transmitting antenna having a third radiation pattern; a main lobe of the first radiation pattern pointing in a first direction; a main lobe of the second radiation pattern pointing in a second direction which is at a first angle of between 1 degree and 90 degrees relative to the first direction; and a main lobe of the third radiation pattern pointing in a third direction; the third direction being at a second angle of between 1 degree and 90 degrees relative to the second direction; receiving radar signals which are reflected on the object; determining the position angle of the object based on phase differences and based on amplitude differences, which originate from the emission of the radar signals in the first through third directions, between the received reflected radar signals.

Moreover, the present invention provides a MIMO radar device for determining a position angle of an object, including: a first transmitting antenna with the aid of which first radar signals having a first radiation pattern are emittable; a second transmitting antenna with the aid of which second radar signals having a second radiation pattern are emittable; a third transmitting antenna with the aid of which third radar signals having a third radiation pattern are emittable; a main lobe of the first radiation pattern pointing in a first direction; a main lobe of the second radiation pattern pointing in a second direction which is at a first angle of between 1 degree and 90 degrees relative to the first direction; and a main lobe of the third radiation pattern pointing in a third direction; the third direction being at a second angle of between 1 degree and 90 degrees relative to the second direction; at least one receiving antenna with the aid of which radar signals which are reflected on the object are receivable; and an evaluation device with the aid of which the position angle of the object is determinable based on phase differences and based on amplitude differences, which originate from the emission of the radar signals in the first through third directions, between the received reflected radar signals.

Advantages of the Invention

The present invention is based on the finding that as the result of emitting the radar signals in various directions, angle-dependent amplitude differences of the emitted, reflected, and received radar signals occur which, together with the angle-dependent phase differences of the received radar signals, are utilizable for precisely determining the position angle of the object.

The method according to the present invention may be carried out without phase coherence of the switching states of the transmitting antennas, in particular without phase coherence of the emitted radar signals, so that, for example, even comparatively slow FMCW ramps are emittable as radar signals, and are evaluatable when reflected on the object. The angle-dependent amplitude differences of the transmitting antennas are utilized according to the present invention for ambiguity resolution, i.e., for distinguishing between multiple objects, and/or for increasing the angular accuracy. Accordingly, ambiguous receiver arrays, i.e., arrangements of receiving antennas of the MIMO radar device having a relatively large aperture, may be used, since the ambiguities as described above are resolved via the amplitude differences of the transmission states, i.e., the radar signals.

According to one preferred refinement, the first angle and the second angle are equal. According to another preferred refinement, the first angle is smaller than the second angle. According to another preferred refinement, the method includes the following step: emitting a fourth radar signal having a fourth radiation pattern, with the aid of a fourth transmitting antenna; a main lobe of the fourth radiation pattern pointing in a fourth direction which is at a third angle of between 1 degree and 90 degrees relative to the third direction.

According to another preferred refinement, the first angle and the third angle are equal. According to another preferred refinement, the first angle, the second angle, and/or the third angle is/are between 5 degrees and 30 degrees, preferably between 10 degrees and 25 degrees. The first, second, and third angles may particularly advantageously be between 20 degrees and 25 degrees, in particular between 20 degrees and 23 degrees, in each case including the entire range.

According to another preferred refinement, the first radar signals, the second radar signals, and/or the third radar signals (and/or optionally the fourth radar signals) have a ramp-shaped time amplitude curve. A temporal extension of each ramp is greater than one millisecond, and is preferably between 1 millisecond and 5 milliseconds, in each case including the entire range.

According to one preferred refinement, the MIMO radar device according to the present invention includes a fourth transmitting antenna with the aid of which fourth radar signals are emittable having a fourth radiation pattern, a main lobe of the fourth radiation pattern pointing in a fourth direction which is at a third angle of between 1 degree and 90 degrees relative to the third direction.

BRIEF DESCRIPTION OF THE DRAWINGS

Unless stated otherwise, identical or functionally equivalent elements and devices are provided with the same reference numerals in all figures.

DETAILED DESCRIPTION

Figure 1:
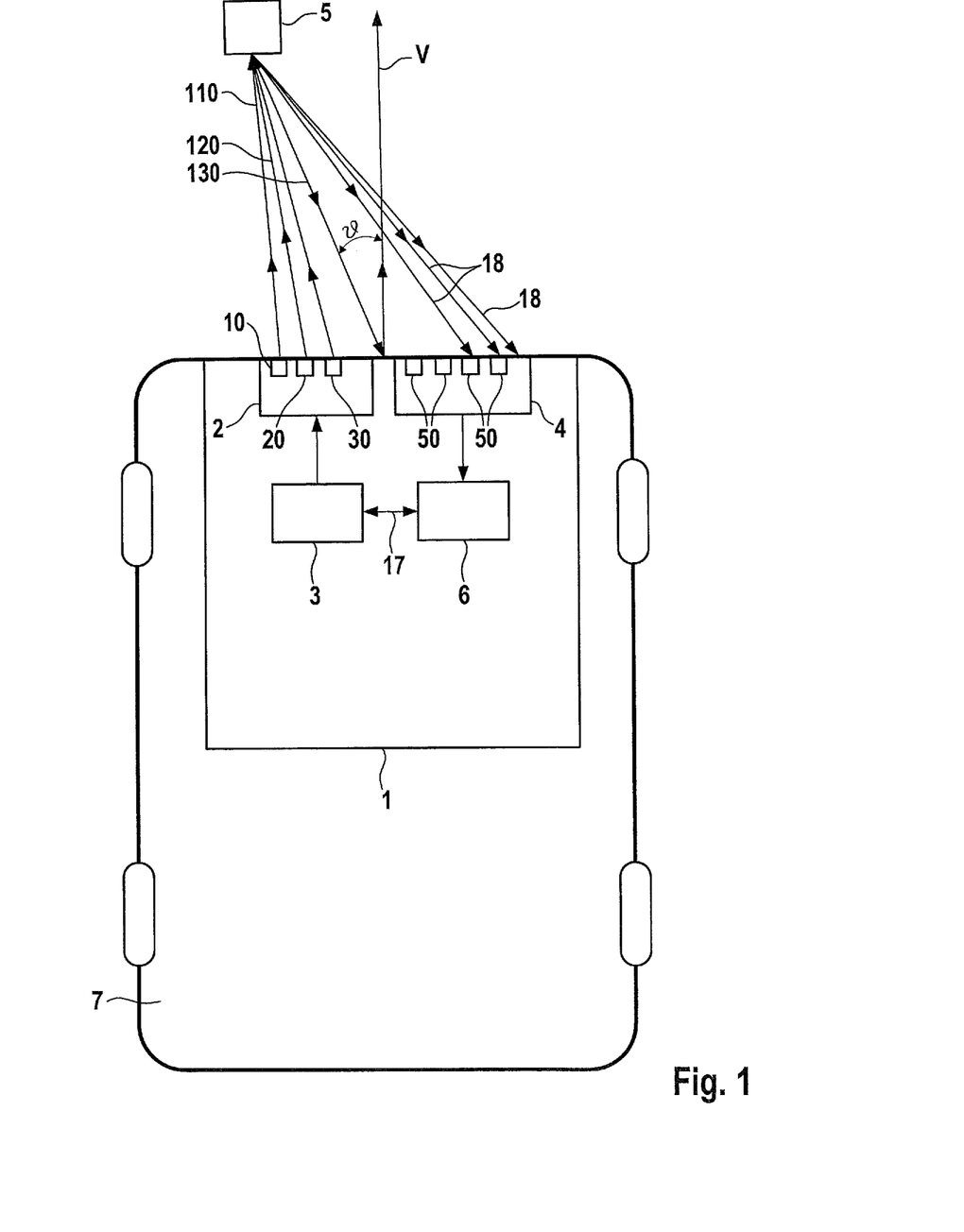
FIG. 1 shows a schematic block diagram of a MIMO radar device for determining a position angle of an object according to a first specific embodiment of the present invention.

FIG. 1 shows a schematic block diagram of a MIMO radar device 1 for determining a position angle θ of an object 5 according to a first specific embodiment of the present invention.

According to FIG. 1, MIMO radar device 1 is provided in a vehicle 7. Radar device 1 includes a planar antenna array which includes a transmitter array 2 including first through third transmitting antennas 10, 20, 30, and a receiver array 4 including four receiving antennas 50. An electromagnetic signal 110, 120, 130 is emittable from antenna device 1 with the aid of first through third transmitting antennas 10, 20, 30, respectively. Emitted electromagnetic signals 110, 120, 130 may be reflected on external object 5, for example, resulting in reflected electromagnetic signals 18. The four receiving antennas 50 are situated relative to one another at positions 0, 1.8, 2.94, and 6.89, in each case measured in units of the wavelength of the radar signals to be emitted.

Reflected electromagnetic signals 18 are receivable with the aid of receiving antennas 50 of receiver array 4, and are evaluatable with the aid of an evaluation device 6 for determining position angle θ of object 5. Position angle θ is defined on the basis of MIMO antenna device 1. When antenna device 1 is situated in vehicle 7, position angle θ is advantageously measured with respect to forward travel direction V of vehicle 7, with the base point of forward travel direction V on vehicle 7 as the vertex, and with a covered angular sector in parallel to a driving plane of vehicle 7.

The emission of electromagnetic signals 110, 120, 130 is controlled with the aid of a control device 3, which may be connected to evaluation device 6 via data lines 17, so that parameters provided by control device 3 concerning phase distances, transmission times, signal ramps, etc., of emitted electromagnetic signals 110, 120, 130 may be taken into account by evaluation device 6 in determining position angle θ.

First radar signals 110 are emittable having a first radiation pattern 112 with the aid of first transmitting antenna 10. Second radar signals 120 are emittable having a second radiation pattern 122 with the aid of transmitting antenna 20. Third radar signals 130 are emittable having a third radiation pattern 132 with the aid of third transmitting antenna 30. First through third radiation patterns 112, 122, 132 of first through third transmitting antennas 10, 20, 30 according to the first specific embodiment of the present invention are explained in greater detail with reference to FIG. 3. MIMO radar device 1 according to the first specific embodiment is suited in particular for carrying out the method according to the second specific embodiment, as described in greater detail below.

Transmitting antennas 10, 20, 30 of the MIMO radar device may also be supplemented by a fourth transmitting antenna, with the aid of which fourth radar signals are emittable having a fourth radiation pattern. For emitting first through fourth radar signals 210, 220, 230, 240; 310, 320, 330, 340 having first through fourth radiation patterns 212, 222, 232, 242; 312, 322, 332, 342, according to the third or the fourth specific embodiment of the present invention, first through fourth transmitting antennas 10, 20, 30 may be adaptable, i.e., using first through fourth radiation patterns 212, 222, 232, 242; 312, 322, 332, 342, which are explained with reference to FIGS. 4 and 5.

According to the first specific embodiment, first through third transmitting antennas 10, 20, 30 are designed as patch antennas including six columns of patch elements whose respective radiation patterns 112, 122, 123 are adaptable by phase-shifted control of the individual patch elements of the patch antennas, for example according to the "phased array" principle.

Position angle θ of object 5 is determinable based on phase differences and based on amplitude differences of received reflected radar signals 18, with the aid of evaluation device 6. For the amplitude differences, in particular those amplitude differences of received reflected radar signals 18 are used in the evaluation which originate from the emission of first through third radar signals 110, 120, 130 in first through third directions 116, 126, 136, which are different from one another. For this purpose, first through third directions 116, 126, 136 are stored in evaluation device 6.

Figure 3:
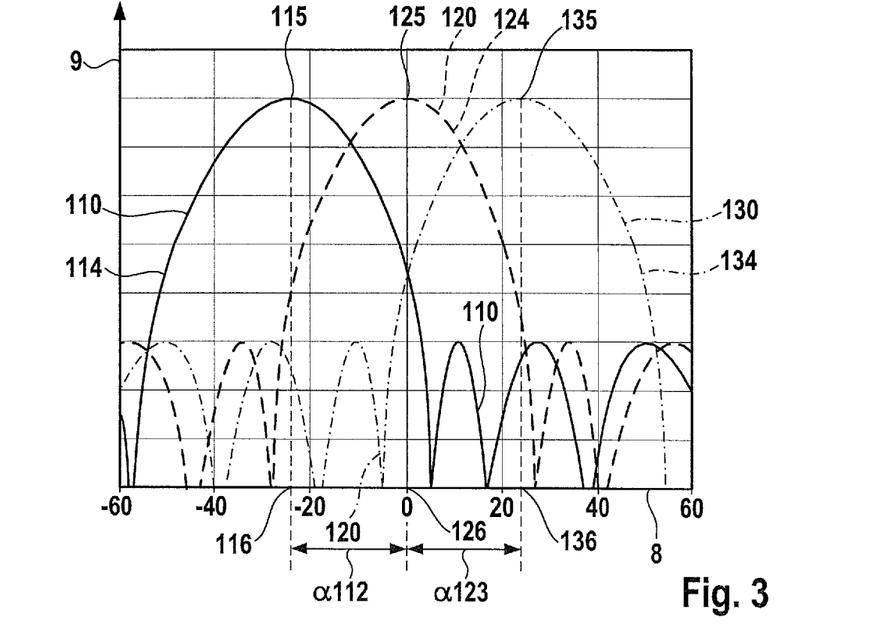
FIG. 3 shows a schematic graph for explaining the method for determining a position angle of an object according to a second specific embodiment of the present invention.
Figure 4:
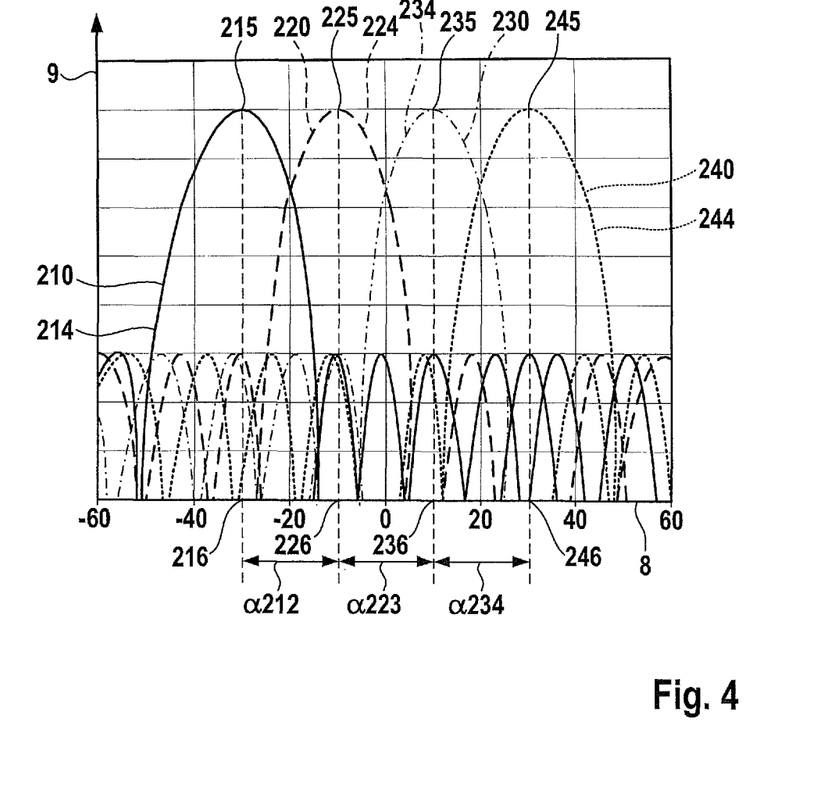
FIG. 4 shows a schematic graph for explaining a method for determining a position angle of an object according to a third specific embodiment of the present invention.
Figure 5:
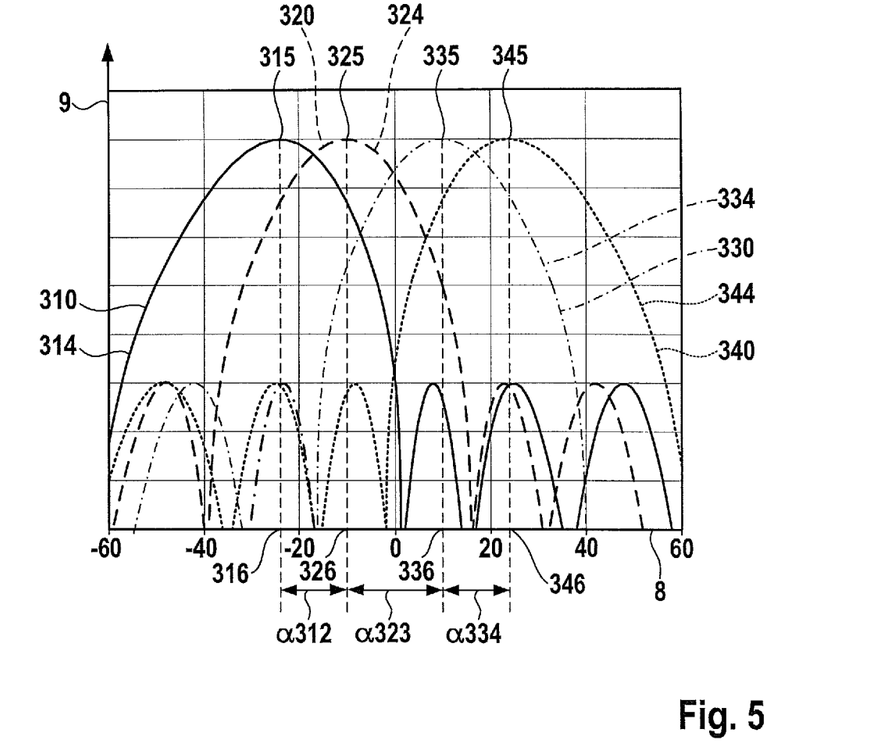
FIG. 5 shows a schematic graph for explaining a method for determining a position angle of an object according to a fourth specific embodiment of the present invention.

First through third directions 116, 126, 136 may also optionally be dynamically adaptable with the aid of control device 3, for example with the aid of electronic beam scanning, the angles between first through third directions 116, 126, 136 being held constant (also see FIGS. 3 through 5). For this purpose, information concerning the particular instantaneous orientation of first through third or optionally fourth transmitting antennas 10, 20, 30 may be transmitted periodically or continuously from the control device to evaluation device 6.

Figure 2:
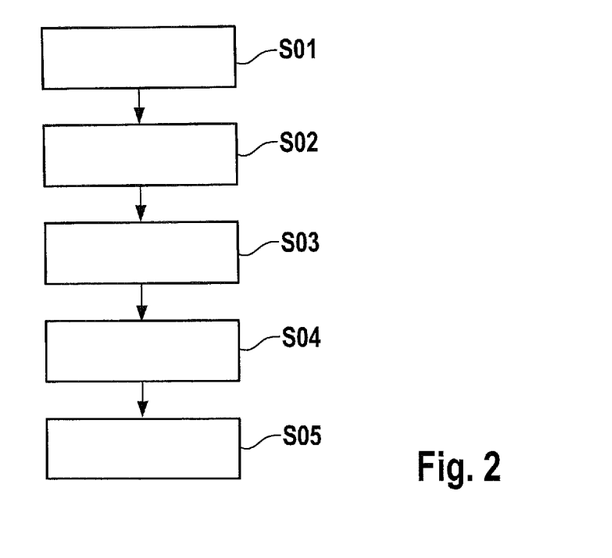
FIG. 2 shows a schematic flow chart for explaining a method for determining a position angle of an object according to a second specific embodiment of the present invention.

FIG. 2 shows a schematic flow chart for explaining a method for determining a position angle θ of an object 5 according to a second specific embodiment of the present invention. The method according to the present invention is suited in particular for operating a MIMO radar device according to the present invention, in particular MIMO radar device 1 according to the first specific embodiment of the present invention. The MIMO radar device may advantageously be adapted to variations and refinements of the method according to the present invention, and vice versa. In the description of the method according to the present invention, reference is also made to reference numerals in FIG. 1 and FIGS. 3 through 5. The method according to the second specific embodiment is explained in greater detail below with reference in particular to FIG. 3.

A first radar signal 110 is emitted in a step S01, with the aid of a first transmitting antenna 10 having a first radiation pattern 112. A second radar signal 120 is emitted in a step S02, with the aid of a second transmitting antenna 20 having a second radiation pattern 122. A third radar signal 130 is emitted in a step S03, with the aid of a third transmitting antenna 30 having a third radiation pattern 132.

A main lobe 114 of first radiation pattern 112 points in a first direction 116. A main lobe 124 of second radiation pattern 122 points in a second direction 126 which is at a first angle α112 of 22.5 degrees relative to first direction 116. A main lobe 134 of third radiation pattern 132 points in a third direction 136, the third direction 136 being at a second angle α123 of 22.5 degrees relative to second direction 126. First and second angles α112, α123 are situated in the same virtual plane, which in particular is situated in parallel to the driving plane of vehicle 7, if the method is used for operating a MIMO radar device provided in a vehicle 7.

Radar signals 18 reflected on object 5 are received in a step S04, in particular with the aid of receiving antennas 50.

Position angle θ of object 5 is determined, i.e., computed, in a step S04 based on phase differences and based on amplitude differences, which originate from emissions S01, S02, S03 of radar signals 110, 120, 130 in first through third directions 116, 126, 136, between received reflected radar signals 18.

FIG. 3 shows a schematic graph for explaining a method for determining a position angle θ of an object 5 according to a second specific embodiment of the present invention.

Directions of the angle at which main lobes 114, 124, 134 of first through third radiation patterns 112, 122, 132 of first through third transmitting antennas 10, 20, 30 are oriented according to the present invention are provided on a horizontal axis 8. When correctly adjusted, the direction at 0° along horizontal coordinate axis 8 points exactly in forward travel direction V of vehicle 7. In this case, negative angles along horizontal coordinate axis 8 refer to directions "to the left" ahead of vehicle 7, and positive angles refer to directions "to the right" ahead of vehicle 7.

Power is plotted on a vertical coordinate axis 9. The curves of first, second, and third radar signals 110, 120, 130 thus denote the power which is emitted when first through third radar signals 110, 120, 130 are emitted in certain directions, i.e., angles, according to the radiation patterns of transmitting antennas 10, 20, 30.

According to FIG. 3, main lobe 114 of first radar signal 110 emitted by first transmitting antenna 10 has its maximum 115 at −22.5°. This means that first radar signal 110 is emitted in a first direction 116 of −22.5°, based on forward travel direction V of vehicle 7. Main lobe 124 of second radar signal 120 emitted by second transmitting antenna 20 has its maximum 125 at 0°. This means that second radar signal 120 is emitted in a second direction 126 of 0°, based on forward travel direction V of vehicle 7. Main lobe 134 of third radar signal 130 emitted by third transmitting antenna 30 has its maximum 135 at +22.5°. This means that third radar signal 130 is emitted in a third direction 136 of +22.5°, based on forward travel direction V of vehicle 7.

First direction 116 and second direction 126 together form a first angle α112 having an absolute value of 22.5°. Second direction 126 and third direction 136 form a second angle α123 having an absolute value of likewise 22.5°. First angle α112 and second angle α123 are situated in a shared virtual plane which is in parallel to the driving plane of vehicle 7. An additional angle, not denoted, between first direction 116 and second direction 136 therefore has an absolute value of 45°.

FIG. 4 shows a schematic graph for explaining a method for determining a position angle θ of an object 5 according to a third specific embodiment of the present invention. The method according to the third specific embodiment is a variant of the method according to the second specific embodiment, and differs from same in that a fourth transmitting antenna is used for emitting a fourth radar signal 240 in a fourth direction 246, and differs in the selection of first through third directions 216, 226, 236 in which first through third radar signals 210, 220, 230 are emitted.

According to FIG. 4, main lobe 214 of first radar signal 210 emitted by first transmitting antenna 10 has its maximum 215 at −30°. This means that first radar signal 210 is emitted in a first direction 216 of −30°, based on forward travel direction V of vehicle 7. Main lobe 224 of second radar signal 220 emitted by second transmitting antenna 20 has its maximum 225 at −10°. This means that second radar signal 220 is emitted in a second direction 226 of −10°, based on forward travel direction V of vehicle 7. Main lobe 234 of third radar signal 230 emitted by third transmitting antenna 30 has its maximum 235 at +10°. This means that third radar signal 230 is emitted in a third direction 236 of +10°, based on forward travel direction V of vehicle 7. A main lobe 244 of a fourth radar signal 240 emitted by a fourth transmitting antenna has its maximum 245 at +30°. This means that fourth radar signal 240 is emitted in a fourth direction 226 of +30°, based on forward travel direction V of vehicle 7.

First direction 216 and second direction 226 together form a first angle α212 having an absolute value of 20°. Second direction 226 and third direction 236 form a second angle α223 having an absolute value of likewise 20°. Third direction 236 and fourth direction 246 form a third angle α234 having an absolute value of likewise 20°. First angle α212, second angle α223, and third angle α234 are situated in a shared virtual plane which is in parallel to the driving plane of vehicle 7. An additional angle, not denoted, between first direction 216 and fourth direction 246 therefore has an absolute value of 50°.

According to the third specific embodiment, based on the amplitude gradients at the intersection points of main lobes 214, 224, 234, 244 at −20°, 0°, and +20°, the beam width may be reduced in relation to the second specific embodiment, and the angular accuracy and the angular separation capability may thus be improved.

For carrying out the method according to the third specific embodiment, the MIMO radar device according to the first specific embodiment may be modified in particular in such a way that four transmitting antennas are designed as patch antennas, each including ten columns of patch elements. The receiving antennas are situated relative to one another at positions 0, 1.64, 2.82, and 6.77, in each case in units of the wavelength of radar signals 210, 220, 230, 240 to be emitted.

FIG. 5 shows a schematic graph for explaining a method for determining a position angle θ of an object 5 according to a fourth specific embodiment of the present invention. The method according to the fourth specific embodiment is a variant of the method according to the third specific embodiment, and differs from same in first through fourth directions 316, 326, 336, 346 in which first through fourth radar signals 310, 320, 330, 340 are emitted.

According to FIG. 5, main lobe 314 of first radar signal 310 emitted by first transmitting antenna 10 has its maximum 315 at −25°. This means that first radar signal 310 is emitted in a first direction 316 of −25°, based on forward travel direction V of vehicle 7. Main lobe 324 of second radar signal 320 emitted by second transmitting antenna 20 has its maximum 325 at −10°. This means that second radar signal 320 is emitted in a second direction 226 of −10°, based on forward travel direction V of vehicle 7. Main lobe 334 of third radar signal 330 emitted by third transmitting antenna 30 has its maximum 335 at +10°. This means that third radar signal 330 is emitted in a third direction 336 of +10°, based on forward travel direction V of vehicle 7. Main lobe 344 of fourth radar signal 340 emitted by the fourth transmitting antenna has its maximum 345 at +30°. This means that fourth radar signal 340 is emitted in a fourth direction 326 of +30°, based on forward travel direction V of vehicle 7.

First direction 316 and second direction 326 together form a first angle α312 having an absolute value of 15°. Second direction 326 and third direction 336 form a second angle α223 having an absolute value of 20°. Third direction 336 and fourth direction 346 form a third angle α334 having an absolute value of 15°. First angle α312, second angle α323, and third angle α334 are situated in a shared virtual plane which is in parallel to the driving plane of vehicle 7. An additional angle, not denoted, between first direction 316 and fourth direction 346 therefore has an absolute value of 50°.

For carrying out the method according to the fourth specific embodiment, the MIMO radar device according to the first specific embodiment may be modified in particular in such a way that four transmitting antennas are designed as patch antennas, each including six columns of patch elements. The receiving antennas are situated relative to one another at positions 0, 1.64, 2.87, and 7.41, in each case in units of the wavelength of radar signals 310, 320, 330, 340 to be emitted.

Although the present invention has been described above with reference to preferred exemplary embodiments, it is not limited thereto, and may be modified in numerous ways. In particular, the present invention may be changed or modified in various ways without departing from the core of the present invention.

For example, for emitting first through third (or optionally fourth) radar signals in the first through third (or optionally fourth) directions, which are different from one another, the first through third (or optionally fourth) transmitting antennas of the MIMO radar device may be designed or installed in a structurally pivoted manner in relation to one another. The first and second angles may also be situated in different virtual planes which form a dihedral angle of between 0 degrees and 90 degrees, preferably between 0 degrees and 45 degrees, preferably between 0 degrees and 30 degrees, in particular between 0 degrees and 10 degrees. The same may similarly apply to the second and third angles.

What is claimed is:

1. A method for determining a position angle of an object, the method comprising:
   emitting a first radar signal via a first transmitting antenna, of a transmitter array of a MIMO radar device, having a first radiation pattern;
   emitting a second radar signal via a second transmitting antenna, of the transmitter array of the MIMO radar device, having a second radiation pattern;
   emitting a third radar signal via a third transmitting antenna, of a transmitter array of the MIMO radar device, having a third radiation pattern, wherein:
      a main lobe of the first radiation pattern points in a first direction,
      a main lobe of the second radiation pattern points in a second direction which is at a first angle of between 1 degree and 90 degrees relative to the first direction, and
      a main lobe of the third radiation pattern points in a third direction which is at a second angle of between 1 degree and 90 degrees relative to the second direction;
   receiving radar signals reflected on the object; and
   emitting a fourth radar signal via a fourth transmitting antenna having a fourth radiation pattern, wherein a main lobe of the fourth radiation pattern points in a fourth direction which is at a third angle of between 1 degree and 90 degrees relative to the third direction; and
   determining the position angle of the object based on phase differences and based on amplitude differences that originate from the emission of the radar signals in the first through fourth directions, between the received reflected radar signals;
   wherein the position angle is defined based on the MIMO radar device situated in a vehicle, wherein the position angle is measured with respect to forward travel direction of the vehicle, with a base point of the forward travel direction on the vehicle as the vertex, and with a covered angular sector in parallel to a driving plane of the vehicle; and
   wherein the first direction and the second direction together form a first angle having an absolute value of about 20°, the second direction and the third direction form a second angle having an absolute value of about 20°, the third direction and the fourth direction form a third angle having an absolute value of about 20°, the first angle, the second angle, and the third angle are situated in a shared virtual plane which is in parallel to the driving plane of the vehicle, and an additional angle between the first direction and the fourth direction has an absolute value of about 50°.

2. The method as recited in claim 1, wherein the first angle and the second angle are equal.

3. The method as recited in claim 1, wherein the first angle is smaller than the second angle.

4. The method as recited in claim 1, wherein the first angle and the third angle are equal.

5. The method as recited in claim 1, wherein at least one of the first angle, the second angle, and the third angle is between 5 degrees and 30 degrees.

6. The method as recited in claim 1, wherein at least one of the first angle, the second angle, and the third angle is between 10 degrees and 25 degrees.

7. The method as recited in claim 1, wherein at least one of the first radar signal, the second radar signal, the third radar signal, and the fourth radar signal have a ramp-shaped time amplitude curve, a temporal extension of each ramp being greater than one millisecond.

8. A MIMO radar device for determining a position angle of an object, comprising:
   a first transmitting antenna, of a transmitter array of the MIMO radar device, via which first radar signals are emittable having a first radiation pattern;
   a second transmitting antenna, of the transmitter array of the MIMO radar device, via which second radar signals are emittable having a second radiation pattern;
   a third transmitting antenna, of the transmitter array of the MIMO radar device, via which third radar signals are emittable having a third radiation pattern;
   a fourth transmitting antenna via which fourth radar signals are emittable having a fourth radiation pattern, a main lobe of the fourth radiation pattern pointing in a fourth direction which is at a third angle of between 1 degree and 90 degrees relative to the third direction;
   wherein:
      a main lobe of the first radiation pattern points in a first,
      a main lobe of the second radiation pattern points in a second direction which is at a first angle of between 1 degree and 90 degrees relative to the first direction, and
      a main lobe of the third radiation pattern points in a third direction, the third direction being at a second angle of between 1 degree and 90 degrees relative to the second direction;
   at least one receiving antenna via which radar signals reflected on the object are receivable; and
   an evaluation device via which the position angle of the object is determinable based on phase differences and based on amplitude differences, which originate from the emission of the radar signals in the first through fourth directions, between the received reflected radar signals;
   wherein the position angle is defined based on the MIMO radar device situated in a vehicle, wherein the position angle is measured with respect to forward travel direction of the vehicle, with a base point of the forward travel direction on the vehicle as the vertex, and with a covered angular sector in parallel to a driving plane of the vehicle, and
   wherein the first direction and the second direction together form a first angle having an absolute value of about 20°, the second direction and the third direction form a second angle having an absolute value of about 20°, the third direction and the fourth direction form a third angle having an absolute value of about 20°, the first angle, the second angle, and the third angle are situated in a shared virtual plane which is in parallel to the driving plane of the vehicle, and an additional angle between the first direction and the fourth direction has an absolute value of about 50°.

* * * * *